(12) United States Patent
Pedersen

(10) Patent No.: US 9,500,181 B2
(45) Date of Patent: Nov. 22, 2016

(54) METHOD FOR CONTROLLING A WIND TURBINE INCLUDING REVERSING AN ENERGY FLOW THROUGH A GENERATOR

(71) Applicant: VESTAS WIND SYSTEMS A/S, Aarhus N (DK)

(72) Inventor: Tune Pedersen, Hinnerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 14/755,103

(22) Filed: Jun. 30, 2015

(65) Prior Publication Data

US 2016/0003221 A1   Jan. 7, 2016

(30) Foreign Application Priority Data

Jul. 2, 2014   (DK) .................................. 2014 70413

(51) Int. Cl.
*F03D 7/00* (2006.01)
*F03D 7/04* (2006.01)
*F03D 7/02* (2006.01)
*F03D 9/00* (2016.01)

(52) U.S. Cl.
CPC ............. *F03D 7/042* (2013.01); *F03D 7/0224* (2013.01); *F03D 7/0284* (2013.01); *F03D 7/048* (2013.01); *F03D 9/005* (2013.01); *F05B 2270/1033* (2013.01); *F05B 2270/337* (2013.01); *Y02E 10/723* (2013.01)

(58) Field of Classification Search
CPC ....................................................... F03D 9/00
USPC .......................................................... 290/44
See application file for complete search history.

(56) References Cited

U.S. PATENT DOCUMENTS

| 4,449,053 | A | * | 5/1984 | Kutcher | .................. | F03D 13/20 |
| | | | | | | 290/44 |
| 4,464,579 | A | * | 8/1984 | Schwarz | ................. | F03D 7/026 |
| | | | | | | 290/44 |
| 2002/0084655 | A1 | * | 7/2002 | Lof | ........................ | F03D 7/0284 |
| | | | | | | 290/44 |
| 2002/0103745 | A1 | * | 8/2002 | Lof | ......................... | F03D 9/005 |
| | | | | | | 705/37 |
| 2005/0134206 | A1 | * | 6/2005 | Hoff | ...................... | B60L 11/123 |
| | | | | | | 318/141 |
| 2010/0158687 | A1 | | 6/2010 | Dawson et al. | | |
| 2011/0301769 | A1 | | 12/2011 | Lovmand et al. | | |
| 2013/0328309 | A1 | * | 12/2013 | Fujii | ..................... | F03D 7/0272 |
| | | | | | | 290/44 |

FOREIGN PATENT DOCUMENTS

| EP | 1775819 | A2 | 4/2007 | | |
| EP | 2557311 | A1 | 2/2013 | | |
| EP | 2733810 | A1 | 3/2014 | | |
| GB | 2448138 | A | * | 10/2008 | ............ F03D 3/065 |
| WO | 2013000474 | A2 | 1/2013 | | |
| WO | 2014/194914 | A1 | 12/2014 | | |
| WO | 2015/067408 | A1 | 5/2015 | | |

OTHER PUBLICATIONS

European Search Report for EP 15173137, Nov. 9, 2015.

* cited by examiner

*Primary Examiner* — Joseph Waks
(74) *Attorney, Agent, or Firm* — Patterson + Sheridan, LLP

(57) ABSTRACT

Controlling operation of a wind turbine coupled to a power grid is disclosed. The power grid is monitored in order to determine whether or not there is a match between a demand for energy defined by power consumers connected to the power grid and supply of energy from power producers connected to the power grid. For instance, the price of energy may be monitored. In the case that the supply of energy from power producers exceeds the demand for energy, and a deficiency between the demand for energy and the supply of energy exceeds a first threshold value, the energy flow through the generator is reversed, thereby causing the generator to consume power received from the power grid. Thereby the deficiency can be reduced and the power grid can be stabilised.

12 Claims, 3 Drawing Sheets

METHOD FOR CONTROLLING A WIND TURBINE INCLUDING REVERSING AN ENERGY FLOW THROUGH A GENERATOR

CROSS-REFERENCE TO RELATED APPLICATIONS

This application claims priority to foreign application PA 2014 70413, filed Jul. 2, 2014 in Demark. The aforementioned related patent application is herein incorporated by reference in its entirety.

FIELD OF THE INVENTION

The present invention relates to a method for controlling a wind turbine. According to the invention an energy flow through the generator of the wind turbine is reversed when certain criteria are fulfilled. Thereby the wind turbine consumes energy from a power grid instead of producing energy to the power grid.

BACKGROUND OF THE INVENTION

Power grids have a number of power producers and a number of power consumers connected thereto. The power producers produce power and deliver the produced power to the power grid. Various kinds of power producers may be connected to a power grid, such as fossil fuelled power plants, nuclear power plants, wind turbines, e.g. in the form of individual wind turbines or wind farms, photovoltaic power cells, hydropower plants, etc.

The larger conventional power producers, such as the fossil fuelled power plants and the nuclear power plants, provide a stable power production, which can be maintained constant on any desired time scale, but it may be difficult and often expensive to adjust the power production from these power producers, at least on a short time scale. Furthermore, the demand for energy defined by the power consumers connected to the power grid also changes, e.g. during the course of the day, during the course of the year, depending on outdoor temperature, etc.

In order to keep the power grid stable, it is desirable to essentially maintain a match between power supplied to the power grid by the power producers and power consumed from the power grid by the power consumers. In situations of a high power production and a low power demand, there is a risk of the power grid becoming unstable.

EP 2 733 810 A1 discloses a method of controlling a power network that includes a plurality of power generation facilities and a plurality of power storage facilities connected to the power generation facilities. In the case of excess power production by the power generation facilities, power may be stored in the power storage facilities, and in the case of power shortage, power from the power storage facilities may be consumed.

DESCRIPTION OF THE INVENTION

It is an object of embodiments of the invention to provide a method for controlling operation of a wind turbine which allows stabilisation of a power grid which the wind turbine is connected to.

It is a further object of embodiments of the invention to provide a method for controlling operation of a wind turbine which allows the wind turbine to react fast on instabilities of a power grid which the wind turbine is connected to.

According to a first aspect the invention provides a method for controlling operation of a wind turbine, the wind turbine comprising a rotor carrying one or more wind turbine blades, and a generator arranged to be coupled to a power grid, the method comprising the steps of:
- monitoring the power grid in order to determine whether or not there is a match between a demand for energy defined by power consumers connected to the power grid and supply of energy from power producers connected to the power grid,
- in the case that the supply of energy from power producers exceeds the demand for energy, and a deficiency between the demand for energy and the supply of energy exceeds a first threshold value, generating a reversing signal for the wind turbine, and
- reversing an energy flow through the generator upon receipt of the reversing signal, thereby causing the generator to consume power received from the power grid.

The method according to the first aspect of the invention is a method for controlling operation of a wind turbine. The wind turbine comprises a rotor carrying one or more wind turbine blades, and a generator arranged to be coupled to a power grid. The wind turbine may further comprise a drive train, e.g. including a gear system, interconnecting the rotor and the generator. As an alternative, the wind turbine may be a gearless wind turbine, or a so-called direct drive wind turbine.

During normal operation of the wind turbine the wind turbine blades catch the wind, thereby causing the rotor to rotate. The rotating movements of the rotor are transferred to the generator, possibly via a drive train. Thereby the generator produces electrical energy, which is supplied to the power grid.

The power grid has a plurality of power producers and a plurality of power consumers connected thereto. The power producers, such as wind turbines, supply energy to the power grid, and the power consumers consume energy from the power grid. As described above, it is desirable that the energy supplied to the power grid by the power producers essentially matches the energy consumed by the power consumers, in order to stabilize the power grid.

In the method according to the first aspect of the invention the power grid is monitored in order to determine whether or not there is a match between a demand for energy defined by power consumers connected to the power grid and supply of energy from power producers connected to the power grid.

In the case that it turns out that the supply of energy from power producers exceeds the demand for energy then there is a surplus of energy available in the power grid, and therefore there is a risk that the power grid becomes unstable. It may therefore be necessary to take actions to prevent this. To this end the operators of the power grid may adjust the price of energy in a downwards direction in order to encourage the power consumers to consume more energy, and to encourage the power producers to produce less energy, thereby attempting to decrease the deficiency between the produced energy and the consumed energy. If this does not have the desired effect, the price of energy may continue to decrease, and may even become negative. In this case the power producers must pay the owner of the power grid for receiving the produced energy instead of receiving a revenue from the owner of the power grid.

Thus, if the supply of energy from power producers exceeds the demand for energy, it is investigated how large the deficiency is in order to determine how severe the problem is. If the deficiency exceeds a first threshold value, it is determined that additional measures are required in order to prevent that the power grid becomes unstable. Therefore a reversing signal is generated for the wind turbine.

Upon receipt of the reversing signal, the wind turbine reverses the energy flow through the generator, thereby causing the generator to consume power received from the power grid, instead of producing power and supplying it to the power grid. Thus, the generator operates as a motor. Accordingly, in this situation the wind turbine is transformed from a power producer to a power consumer, and it thereby efficiently helps in reducing the deficiency between produced energy and consumed energy. Furthermore, in the case that the energy price is negative, the owner of the wind turbine may even receive a revenue in this case.

Thus, according to the first aspect of the invention, the wind turbine is capable of contributing to stabilising the power grid in the case of excess energy production, and the wind turbine is furthermore capable of reacting fast.

As the share of produced energy originating from renewable power sources increases, the risk of instabilities of the power grid due to a mismatch between produced energy and consumed energy increases. It therefore becomes increasingly important to be able to take steps towards stabilising the power grid, and to be able to react fast. Therefore the method according to the first aspect of the invention makes it possible to allow a larger share of renewable energy sources to be connected to the power grid, thereby providing a more green energy production where the consumption of fossil fuel can be reduced.

The reversed energy flow through the generator may result in the rotor being forced to rotate by the generator. According to this embodiment the generator, acting as a motor, drives the rotor, causing it to rotate, thereby producing mechanical energy. This is opposite to the situation during normal operation, where the wind drives the rotating movements of the rotor, and this rotating movement is transferred to the generator in order to generate electrical energy.

The step of monitoring the power grid may comprise monitoring a price of energy supplied to the power grid by power producers, and the first threshold value may be defined by a negative price of energy supplied to the power grid. According to this embodiment, the energy flow through the generator is reversed when the price of energy becomes negative, or possibly when the price reaches a certain negative value. Thereby the owner of the wind turbine will receive payment from the owner of the power grid instead of having to pay the owner of the power grid for receiving produced energy. As described above, the price of energy may be reduced in the case of surplus energy being available in the power grid, and this may sometimes lead to a negative price of energy. Therefore the price of energy provides a measure for whether or not the energy supplied to the power grid by the power produces matches the energy demand of power consumers connected to the power grid.

As an alternative, the step of monitoring the power grid may, e.g., comprise monitoring voltage, frequency and/or any other suitable parameter which may indicate that there is a mismatch between the energy supplied to the power grid by the power producers and the demand for energy defined by the power consumers. For instance, in the case that the demand for energy decreases, while the energy production remains constant, the frequency of the power grid will increase. Therefore the frequency of the power grid is a suitable parameter for detecting a mismatch between the production of energy and the demand for energy.

The method may further comprise the steps of:

in the case that the supply of energy from power producers exceeds the demand for energy, and a deficiency between the demand for energy and the supply of energy exceeds a second threshold value, said second threshold value being lower than the first threshold value, generating a derating signal for the wind turbine, and decreasing the power output from the wind turbine to the power grid upon receipt of the derating signal.

According to this embodiment, if the deficiency between the demand for energy and the supply of energy reaches a second threshold value, being lower than the first threshold value which results in the energy flow through the generator being reversed, the power output from the wind turbine is derated, i.e. the power produced by the wind turbine and supplied to the power grid is set to a level which is below the maximum possible power output of the wind turbine, under the given circumstances, including the current wind conditions.

Thus, according to this embodiment, when the supply of energy to the power grid exceeds the demand for energy, and the deficiency between the produced energy and the demand for energy gradually increases, the second threshold value is first reached. When this happens, the power output from the wind turbine is derated in order to decrease the supply of produced energy to the power grid, thereby attempting to stop the increase in the deficiency between the produced energy and the demand for energy.

However, if derating the power output from the wind turbine is not sufficient to balance the production of energy and the demand for energy, the deficiency will continue to increase. Thereby the first threshold value is reached, resulting in the energy flow through the generator being reversed, as described above.

The power output from the wind turbine may be gradually decreased from a maximum level to zero as the deficiency between the produced energy and the demand for energy increases from the second threshold value to the first threshold value. Thereby a smooth transfer from maximum power output towards zero power production, and further towards reversing the energy flow through the generators is obtained.

The method may further comprise the step of adjusting a pitch angle of the wind turbine blade(s) towards a braking position upon receipt of the reversing signal. When the pitch angle of the wind turbine blade(s) is adjusted towards a braking position, the wind turbine blade(s) counteract(s) the rotating movements of the rotor caused by the reversed energy flow through the generator. Thereby the energy consumption of the generator can be increased, and the wind turbine can to a greater extent contribute to stabilisation of the power grid.

The wind turbine may form part of a wind farm comprising a plurality of wind turbines, and the wind farm may further comprise a wind farm controller arranged to control operation of the wind farm.

In the present context the term 'wind farm' should be interpreted to mean a plurality of wind turbines arranged at a site. The wind turbines of a wind farm are often controlled in dependence of each other in order to maximise the energy production while minimising wear with respect to the entire wind farm instead of with respect to the individual wind turbine. This may be performed by means of a central wind farm controller.

The step of generating a reversing signal may be performed by the wind farm controller. According to this embodiment, it is the wind farm controller which decides when the energy flow through the generator of a given wind turbine of the wind farm should be reversed. The wind farm controller may further decide which of the wind turbines of the wind farm should receive a reversing signal and which should not, if it is determined that reversing signals for one or more wind turbines are required in order to stabilise the power grid. In this case the wind turbines of the wind farm which do not receive a reversing signal may continue to operate normally, or they may be derated or even stopped.

As an alternative, the step of generating a reversing signal may be performed by the wind turbine itself, or it may be performed by an external control unit, for instance a control unit forming part of the power grid system.

Alternatively or additionally, the step of monitoring the power grid may be performed by the wind farm controller. According to this embodiment, the wind farm controller monitors the power grid, and thereby detects when a condition occurs which requires that one or more of the wind turbines of the wind farm reverses the energy flow through the generator. When this is detected, the wind farm controller may either generate reversing signals for one or more of the wind turbines of the wind farm, or the wind farm controller may alert all of the wind turbines of the wind farm, and based on this information, each of the wind turbines of the wind farm may determine whether or not to generate a reversing signal for itself.

As an alternative, the step of monitoring the power grid may be performed by the wind turbine itself, or it may be performed by an external control unit, for instance a control unit forming part of the power grid.

According to one embodiment, the reversing signal may be provided manually by an operator of the wind turbine, e.g. via a communication interface. In this case the operator may provide the reversing signal directly to a given turbine, or the operator may provide the reversing signal to a wind farm controller, which in turn distributes the reversing signal to appropriate wind turbines of the wind farm. Or the operator may provide reversing signals for selected wind turbines, based on a signal generated by the wind farm controller.

The method may further comprise the steps of:
selecting one or more wind turbines of the wind farm to receive a reversing signal in the case that the supply of energy from power producers exceeds the demand for energy, and a deficiency between the demand for energy and the supply of energy exceeds a first threshold value, and
generating a reversing signal for each of the selected wind turbine(s).

These steps may advantageously be performed by the wind farm controller. The wind turbine(s) to receive a reversing signal may, e.g., be selected in such a manner that the total energy production and/or energy consumption of the wind farm meet(s) specific requirements or overall goals. Alternatively or additionally, the wind turbine(s) may be selected in accordance with load considerations of the individual wind turbines and/or in such a manner that the selected wind turbines are not the same wind turbines which were selected the previous time reversing of the energy flow through the generator of one or more wind turbines was required.

The reversing signal may be in the form of a power reference signal defining a negative power reference. Normally, a power reference signal is a signal which indicates a power level which the wind turbine must provide for the power grid. Sometimes the power grid may have a large capacity for receiving produced power. In this case the power reference signal to the wind turbine will normally corresponds to a maximum power output from the wind turbine under the given circumstances, including the current wind conditions. Sometimes the power grid may have limited capacity for receiving power. In this case the power reference signal to the wind turbine may correspond to a power output from the wind turbine, which is lower than the maximum possible power output, i.e. the wind turbine is derated, in order to limit the power supplied to the power grid. In the case that the capacity for receiving power of the power grid decreases, the power reference signal to the wind turbine may be correspondingly changed in order to gradually decrease the power output of the wind turbine. This may be continued until the power production of the wind turbine is zero, i.e. until the wind turbine is stopped. According to the method of the invention, the power reference signal may be even further decreased to a negative value, indicating that the wind turbine should consume power instead of producing power. Thus, according to this embodiment a smooth transfer from producing power to consuming power can be provided.

According to a second aspect the invention provides a wind turbine comprising a rotor carrying one or more wind turbine blades, and a generator arranged to be coupled to a power grid, wherein the wind turbine is capable of carrying out the method according to the first aspect of the invention.

It should be noted that a skilled person would readily recognise that any feature described in combination with the first aspect of the invention could also be combined with the second aspect of the invention, and vice versa. Thus, the remarks set forth above are equally applicable here.

It is noted that the wind turbine may be capable of providing reactive power to the power grid. This capability is available, regardless of whether the wind turbine supplies energy to the power grid or consumes energy from the power grid.

Furthermore, the invention provides a wind farm comprising a plurality of wind turbines and a wind farm controller arranged to control operation of the wind farm, wherein one or more of the wind turbines of the wind farm is a wind turbine according to the second aspect of the invention.

BRIEF DESCRIPTION OF THE DRAWINGS

The invention will now be described in further detail with reference to the accompanying drawings in which.

DETAILED DESCRIPTION OF THE DRAWINGS

Figure 1:
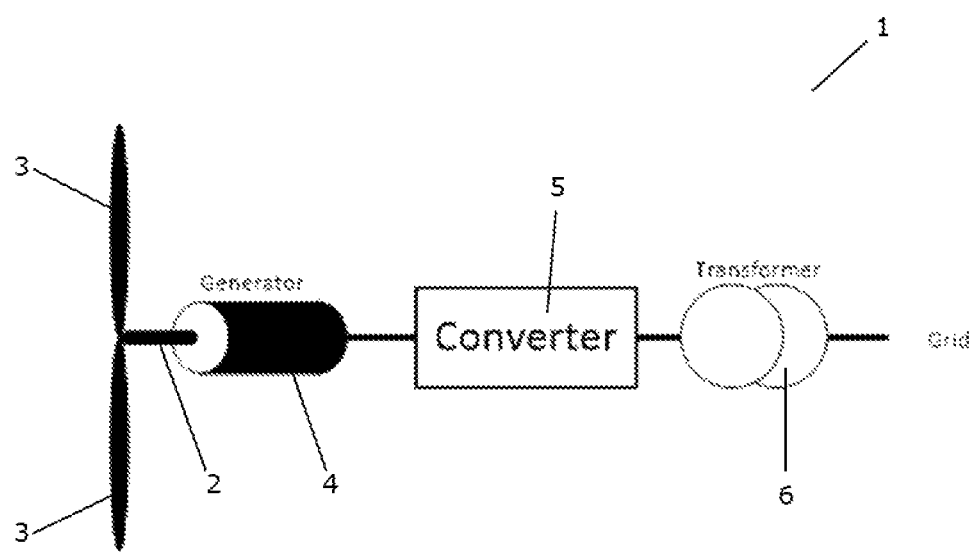
FIG. 1 is a block diagram illustrating a wind turbine being capable of performing a method according to an embodiment of the invention.

FIG. 1 is a block diagram illustrating a wind turbine 1 being capable of performing a method according to an embodiment of the invention. The wind turbine 1 comprises a rotor 2 carrying a number of wind turbine blades 3, two of which are shown.

During normal operation, the wind turbine blades 3 catch the wind, thereby causing the rotor 2 to rotate. The rotor 2 is connected to a generator 4, and the rotational movements of the rotor 2 cause the generator 4 to produce electrical energy. The electrical energy is then supplied to a power grid via a converter 5 and a transformer 6.

In a method according to the present invention, the power grid is monitored in order to determine whether or not there is a match between a demand for energy defined by power consumers connected to the power grid and supply of energy to the power grid from power producers connected to the power grid, such as the wind turbine 1. If it is determined that there is a surplus of energy available in the power grid, and that the surplus of energy is sufficiently large, measures can be taken in order to remove, or at least reduce, this deficiency. A surplus of energy in the power grid can lead to instability of the power grid, and it is therefore very undesirable.

The presence of a surplus of energy can, e.g., be detected by monitoring the price of energy of the power grid. For instance, if the price becomes negative, i.e. if the power producers have to pay the power grid in order to be allowed to provide produced power to the power grid, this is an indication that a large surplus of energy is available, and that there is a risk of the power grid becoming unstable.

Thus, when a sufficiently large surplus of energy in the power grid has been detected, a reversing signal is generated for the wind turbine 1. The reversing signal may, e.g., be generated by the wind turbine 1 itself, by a control unit of the power grid, or by a wind farm controller of a wind farm which the wind turbine 1 forms part of.

In response to the reversing signal, the wind turbine 1 reverses the energy flow through the generator 4. Thereby the wind turbine 1 consumes power from the power grid instead of producing power and supplying it to the power grid. Due to the reversed energy flow through the generator 4, the generator 4 acts as a motor and drives a rotational movement of the rotor 2, including the wind turbine blades 3.

Figure 2:
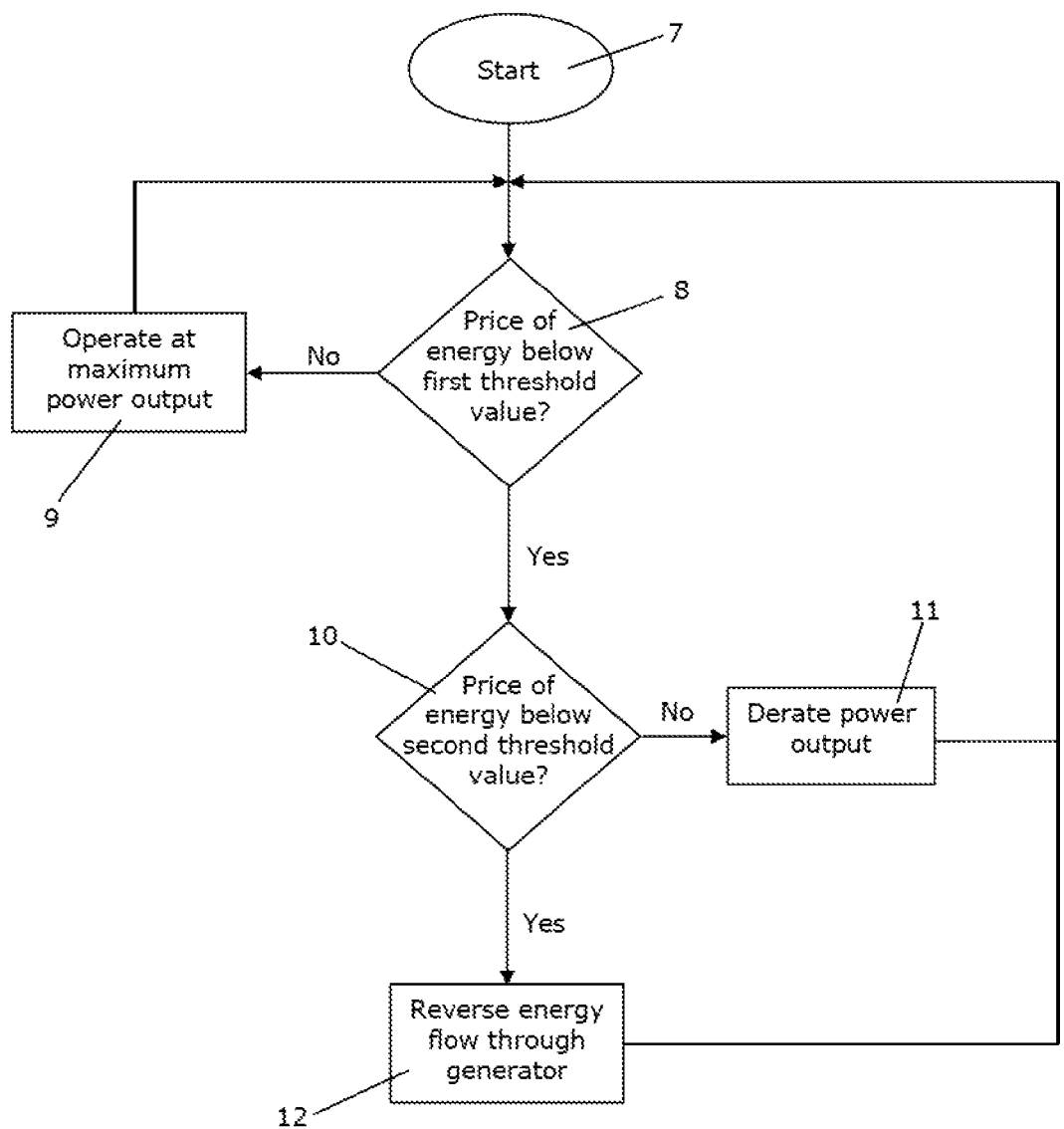
FIG. 2 is a flow diagram illustrating a method according to an embodiment of the invention.

FIG. 2 is a flow diagram illustrating a method for controlling operation of a wind turbine in accordance with an embodiment of the invention. The process is started at step 7. At step 8 it is investigated whether or not a price of energy of a power grid is below a first threshold value. This may be done by monitoring a power grid which the wind turbine is connected to, in particular by monitoring the price of energy.

If step 8 reveals that the price of energy is above the first threshold value, then it is determined that there is no need to adjust the power produced by the wind turbine and supplied to the power grid. Accordingly, the process is forwarded to step 9, where the wind turbine is operated at maximum power output. Then the process is returned to step 8 for continued monitoring of the power grid.

If step 8 reveals that the price of energy is below the first threshold value, this is an indication that there is a surplus of energy available in the power grid, and that there may be a risk of the power grid becoming unstable. Therefore the process is forwarded to step 10, where it is investigated whether or not the price of energy is below a second threshold value, which is lower than the first threshold value.

If step 10 reveals that the price of energy is above the second threshold value, i.e. that the price of energy is between the second threshold value and the first threshold value, then it is determined that it is necessary to adjust the supply of power to the power grid, but that there is no imminent risk of the power grid becoming unstable. Accordingly, the process is forwarded to step 11, where the power output of the wind turbine is derated, i.e. the wind turbine is operated in such a manner that the power output supplied to the power grid is lower than the maximum possible power output of the wind turbine under the given circumstances, including the current wind conditions. Thereby the supply of power to the power grid is reduced, and this may be sufficient to reduce the deficiency between the produced energy and the demand for energy, thereby increasing the price of energy, or at least to stop the decrease in the price of energy. Thus, the derating of the power output of the wind turbine may be sufficient to prevent that the deficiency between the production of energy and the demand for energy reaches a level which causes the power grid to become unstable. Furthermore, the price of energy is used as an indicator for or a measure of this deficiency. The process is then returned to step 8 for continued monitoring of the power grid.

If step 10 reveals that the price of energy is also below the second threshold value, then it is determined that the price of energy is critically low, i.e. the price of energy indicates that the deficiency between the produced energy and the demand for energy is critically high, and that there is an imminent risk that the power grid becomes unstable. Accordingly, the process is forwarded to step 12, where the energy flow through the generator is reversed. Thereby the wind turbine consumes energy from the power grid instead of supplying energy to the power grid. This will help in decreasing the deficiency between the produced energy and the demand for energy, thereby increasing the price of energy, and in stabilising the power grid. Finally, the process is returned to step 8 for continued monitoring of the power grid.

Figure 3:
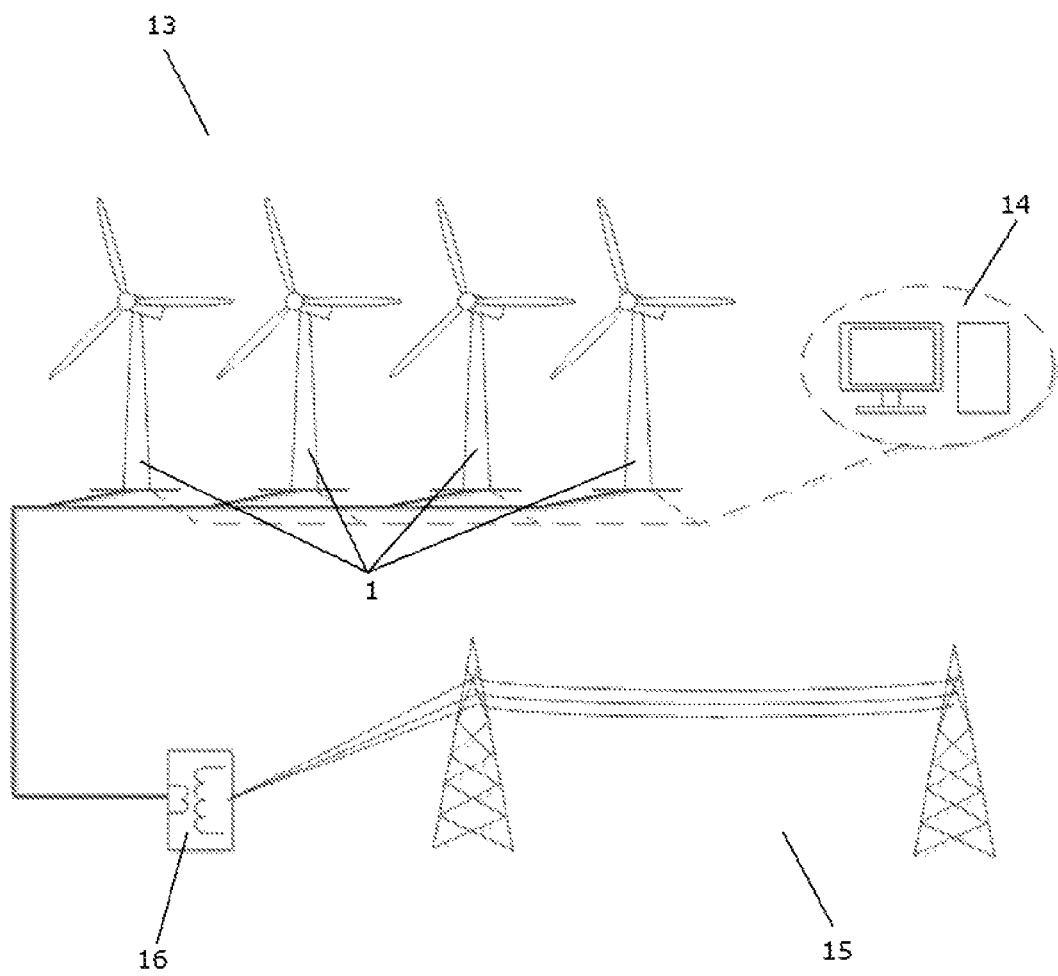
FIG. 3 is a diagrammatic view of a wind farm according to an embodiment of the invention.

FIG. 3 is a diagrammatic view of a wind farm 13 according to an embodiment of the invention. The wind farm 13 comprises a plurality of wind turbines 1 positioned within a site, and at least one of the wind turbines 1 of the wind farm 13 is capable of performing the method according to the invention.

The wind farm 13 comprises a wind farm controller 14 arranged to control operation of the wind farm 13. The wind turbines 1 of the wind farm 13 are connected to a power grid 15 via a substation transformer 6. The wind turbines 1 are, thus, capable of producing power due to the wind, in the manner described above, and of supplying the produced power to the power grid 15.

Furthermore, at least one of the wind turbines 1 of the wind farm 13 is capable of performing the method according to the invention, i.e. at least one of the wind turbines 1 is capable of reversing the energy flow through the generator of the wind turbine 1 in the case that there is a sufficiently large surplus of energy available in the power grid 15. In this case the wind turbine(s) 1 consume(s) energy from the power grid 15 instead of supplying energy to the power grid 15, as described above.

What is claimed is:

1. A method for controlling operation of a wind turbine, the wind turbine comprising a rotor carrying one or more wind turbine blades, and a generator arranged to be coupled to a power grid, the method comprising:

monitoring the power grid in order to determine whether or not there is a match between a demand for energy defined by power consumers connected to the power grid and supply of energy from power producers connected to the power grid, in the case that (1) the supply of energy from power producers exceeds the demand for energy and (2) a deficiency between the demand for energy and the supply of energy exceeds a first threshold value, generating a reversing signal for the wind turbine, and reversing an energy flow through the generator upon receipt of the reversing signal, thereby causing the generator to consume power received from the power grid.

2. The method according to claim 1, wherein the reversed energy flow through the generator results in the rotor being forced to rotate by the generator.

3. The method according to claim 1, wherein the step of monitoring the power grid comprises monitoring a price of energy supplied to the power grid by power producers, and wherein the first threshold value is defined by a negative price of energy supplied to the power grid.

4. The method according to claim 1, further comprising:
in the case that (1) the supply of energy from power producers exceeds the demand for energy and (3) a deficiency between the demand for energy and the supply of energy exceeds a second threshold value, that is less than the first threshold value, generating a derating signal for the wind turbine, and
decreasing the power output from the wind turbine to the power grid upon receipt of the derating signal.

5. The method according to claim 1, further comprising adjusting a pitch angle of the one or more wind turbine blades towards a braking position upon receipt of the reversing signal.

6. The method according to claim 1, wherein the wind turbine forms part of a wind farm comprising a plurality of wind turbines, the wind farm further comprising a wind farm controller arranged to control operation of the wind farm.

7. The method according to claim 6, wherein generating a reversing signal is performed by the wind farm controller.

8. The method according to claim 6, wherein monitoring the power grid is performed by the wind farm controller.

9. The method according to claim 6, further comprising:
selecting one or more wind turbines of the wind farm to receive a reversing signal in the case that the supply of energy from power producers exceeds the demand for energy, and a deficiency between the demand for energy and the supply of energy exceeds a first threshold value, and
generating a reversing signal for each of the selected wind turbine(s).

10. The method according to claim 1, wherein the reversing signal is in the form of a power reference signal defining a negative power reference.

11. A wind turbine, comprising:
a rotor carrying one or more wind turbine blades;
a generator operably connected to the rotor and arranged to be coupled to a power grid; and
a controller configured to perform an operation comprising:
monitoring the power grid in order to determine whether or not there is a match between a demand for energy defined by power consumers connected to the power grid and supply of energy from power producers connected to the power grid,
in the case that (1) the supply of energy from power producers exceeds the demand for energy and (2) a deficiency between the demand for energy and the supply of energy exceeds a first threshold value, generating a reversing signal for the wind turbine, and
reversing an energy flow through the generator upon receipt of the reversing signal, thereby causing the generator to consume power received from the power grid.

12. A wind farm, comprising:
a plurality of wind turbines, each wind turbine of the plurality of wind turbines comprising:
a rotor carrying one or more wind turbine blades; and
a generator operably connected to the rotor and arranged to be coupled to a power grid; and
a wind farm controller configured to perform an operation comprising:
monitoring the power grid in order to determine whether or not there is a match between a demand for energy defined by power consumers connected to the power grid and supply of energy from power producers connected to the power grid, and
in the case that (1) the supply of energy from power producers exceeds the demand for energy and (2) a deficiency between the demand for energy and the supply of energy exceeds a first threshold value, generating a reversing signal for at least one wind turbine of the plurality of wind turbines,
wherein the at least one wind turbine is configured to reverse an energy flow through the respective generator upon receipt of the reversing signal, thereby causing the respective generator to consume power received from the power grid.

* * * * *